(12) United States Patent
Yoshida et al.

(10) Patent No.: US 6,237,285 B1
(45) Date of Patent: *May 29, 2001

(54) PLANT CULTIVATION MAT

(75) Inventors: Minoru Yoshida; Kazuo Kumura, both of Yamato; Takaharu Yoshioka, Sagamihara; Shinji Uchida, Toride, all of (JP)

(73) Assignee: Kyodo KY-TEC Corp., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/288,303

(22) Filed: Apr. 8, 1999

(30) Foreign Application Priority Data

Apr. 10, 1998 (JP) .................................. 10-098651

(51) Int. Cl.$^7$ ...................................................... A01G 9/02
(52) U.S. Cl. .................................................. 47/65.9
(58) Field of Search .................... 47/1.01 F, 1.01 R, 47/65.9, 65.5, 85, 86; 472/92, 94; 473/171

(56) References Cited

U.S. PATENT DOCUMENTS

| | | | |
|---|---|---|---|
| 2,899,775 | * | 8/1959 | Partin . |
| 4,118,892 | * | 10/1978 | Nakamura et al. .................. 47/65.9 |
| 4,173,097 | * | 11/1979 | Staby . |
| 4,926,586 | * | 5/1990 | Nagamatsu ....................... 47/85 X |
| 4,962,855 | * | 10/1990 | Holmquist . |
| 5,203,109 | * | 4/1993 | Simon et al. ........................... 47/85 |
| 5,327,679 | * | 7/1994 | Hawthorne ....................... 47/85 X |
| 5,406,745 | * | 4/1995 | Lin ..................................... 47/1.01 |
| 5,459,960 | * | 10/1995 | Manlove ................................. 47/85 |
| 5,467,554 | * | 11/1995 | Prestele ............................. 47/1.01 |
| 5,467,555 | * | 11/1995 | Ripley, Sr. et al. ................... 47/85 |
| 5,581,936 | * | 12/1996 | Belgiorno . |
| 5,673,513 | * | 10/1997 | Casimaty . |
| 6,085,462 | * | 7/2000 | Thomas ................................. 47/87 |

FOREIGN PATENT DOCUMENTS

266701 * 5/1988 (EP) .

OTHER PUBLICATIONS

Anonymous, McConnkey Co. 1998 Catalog, 1998, p. 28.*

* cited by examiner

*Primary Examiner*—Robert P. Swiatek
(74) *Attorney, Agent, or Firm*—Armstrong, Westerman, Hattori, McLeland & Naughton, LLP

(57) ABSTRACT

A plant cultivation mat (or, grass growing mat) to be spread over artificial ground, which permit walkers to tread on the soil filled in the mat as well as the plant grown in it. The plant cultivation mat comprises a cell disposed in a recessed form with the top part thereof being open upward and with a water-passage port being perforated in the vicinity of the bottom part thereof; and pillar member erected within the cell to a height not exceeding the upper end part of the lateral wall of the cell. Also, this plant cultivation mat comprises a cell disposed in a recessed form with the top part thereof being open upward and with a water-passage port being perforated in the vicinity of the bottom part thereof; and one or a plurality of pillar members erected within the cell to a height not exceeding the upper end part of the lateral wall of the cell; and at least one connecting rib to join the cells together. The pillar member should preferably have a small hole perforated in the top part thereof at an appropriate location.

19 Claims, 10 Drawing Sheets

PLANT CULTIVATION MAT

BACKGROUND OF THE INVENTION a) Field of the Invention

This invention relates to a plant cultivation mat to be disposed, in particular, on artificial ground such as the roof-top of a building, veranda, terrace, and others for growing various plants (grasses) such as, in particular, lawn or other earth-covering plants, flowering plants, vegetables, and so forth.

b) Description of Prior Arts

It has heretofore been a practice, when growing plants at a place having a flat laying surface like the roof-top of a building, terrace, veranda, and others, to form a water-prevention layer and a root-protection layer, or to lay a sheet, on which soil is heaped up to grow lawn or other earth-covering plants, flowering plants, vegetables, and so forth (see: for example, laid-open gazette of Japanese patent application No. 4-99411).

It has also been a practice to lay square boxes (named plant cultivation mats or grass growing mats), each of which has an opening in its bottom part and is disposed in a recessed form with its top part being open upward, spread over the entire flat laying surface of the roof-top of a building, and others, followed by filling soil in the square boxes to grow various plants. Such plant growing facility possesses advantages such as easy laying and removal, and it can also be used in existing buildings.

With the abovementioned plant installation, however, when walkers walk on the top part of the soil as layed down, the level of the soil is lowered by the treading pressure of the walker to become solid and hard, with the consequent difficulty in walking on it. On the other hand, in the greening movement with use of lawn, which has become flourishing in recent years, in particular, free walking on the lawn is the requisite condition, hence the tendency is that public walkers should indispensably be permitted to walk on the top surface part of the soil at the plant (grass) growing facility.

SUMMARY OF THE INVENTION

The present invention has been made in view of the abovementioned problem, and aims at providing a plant cultivation mat (or grass growing mat) for carrying out the plant cultivation on any artificial ground, whereby the public in general becomes able to walk on the soil filled up over the plant cultivation mat or on the top surface of the plant thus grown.

It is therefore a primary object of the present invention to provide a plant cultivation mat (or grass growing mat) which is capable of withstanding the treading pressure, when spread over the entire ground surface of the roof top, the veranda, the terrace, or the like, and yet of giving comfortable and restful sight to those who look at it.

According to the present invention, in one aspect thereof, there is provided a plant cultivation mat, comprising a cell disposed in a recessed form with its top part being open upward, and having water-passage ports perforated in the vicinity of its bottom part; and pillar member erected to a height not exceeding the top end part of the lateral wall of the cell. The pillar member should preferably be erected in a plurality of numbers.

According to the present invention, in another aspect thereof, there is provided a plant cultivation mat, comprising cells disposed in a recessed form with its top part being open upward, and having water-passage ports perforated in the vicinity of its bottom part; a plurality of pillar members erected to a height not exceeding the top end part of the lateral wall of the cells, and connecting ribs to join these cells together.

It is further preferable to have a hole perforated on the top part of the pillar member at any arbitrary location thereof.

The foregoing objects, other objects, and the detailed construction as well as the function of the plant cultivation mat according to the present invention will become more apparent and understandable from the following detailed description thereof, when read in conjunction with the accompanying drawing.

BRIEF EXPLANATIONS OF DRAWINGS

DETAILED DESCRIPTION OF THE INVENTION

By fixing the pillar members in the upright position in the cell for the plant cultivation mat, it becomes possible to grow earth-covering plants, etc. on plant growing ingredients such as earth brought from another place and mixed with soil, light-weight soil, artificial soil, and so forth filled and spread in the cell, thereby upholding the pressure exerted by walkers. In particular, when a plurality of pillar members are to be fixed in the upright position, each independent pillar member bears the dispersed compressive force exerted by treading of walkers, to thereby exhibit high strength against the compressive force, thus preventing the plant cultivation mat from breakage.

The pillar member functions to prevent the soil from becoming solid and hard as well as to prevent its surface from being tread down due to the foot pressure, thereby relaxing possible damage caused to the roots of the earth-covering plants, etc. and maintaining the cultivated plants in a favorable condition.

Further, each of this plurality of independent pillar members, as fixed in the upright position, functions to prevent the earth brought from another place or the light-weight soil for filling in the cell from sinking on its center part due to lapse of a long period of time, or to prevent the light-weight soil, etc. from moving within the cell.

Also, an arrangement is possible such that a small hole is perforated in the top part of the pillar member at an arbitrary location, and, when the top part of the pillar member is flush with, or slightly lower than the upper end part of the lateral wall of the cell, the plant growing ingredients are filled in the cell for the plant cultivation mat at a production site or at a mat laying site, and then seed sheets, turf, or others are placed over the top surface part of the cell, followed by insertion into the small perforation of a fixing device such as pins, etc. to fasten the seed sheets, etc. in position. As the consequence, handling of the plant cultivation mat becomes extremely simple and easy, whereby the plant cultivation mat can be supplied at a low cost.

BEST MODE TO PRACTICE THE INVENTION

In the following, the invention will be described concretely in reference to the accompanying drawings illustrating several preferred embodiments thereof, although the invention is not limited to these embodiment alone.

Figure 1:
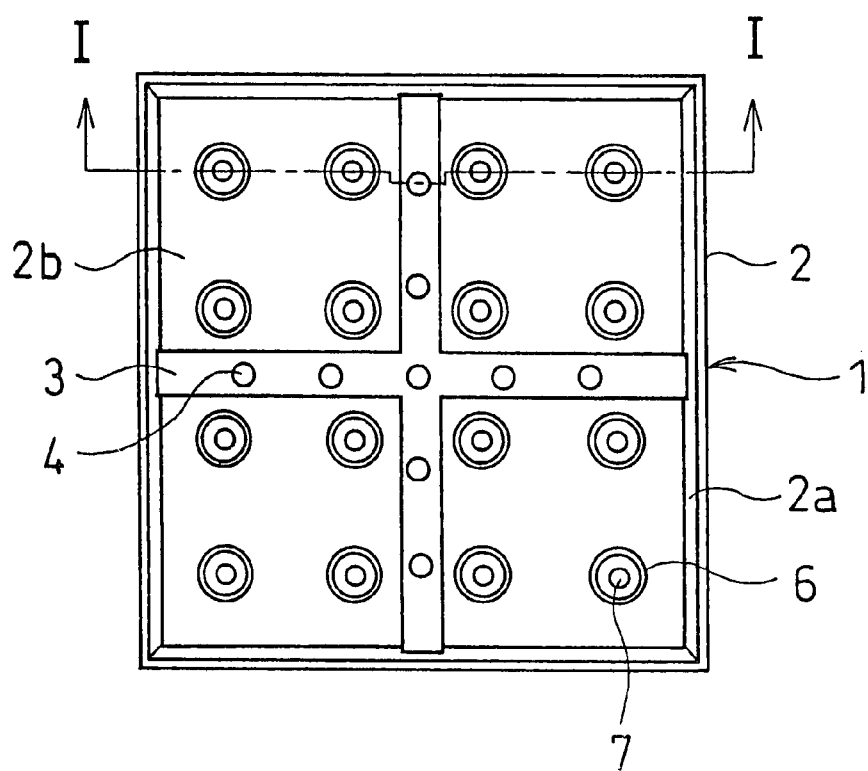
FIG. 1 is a plan view showing a first embodiment of the plant cultivation mat according to the present invention.
Figure 2:
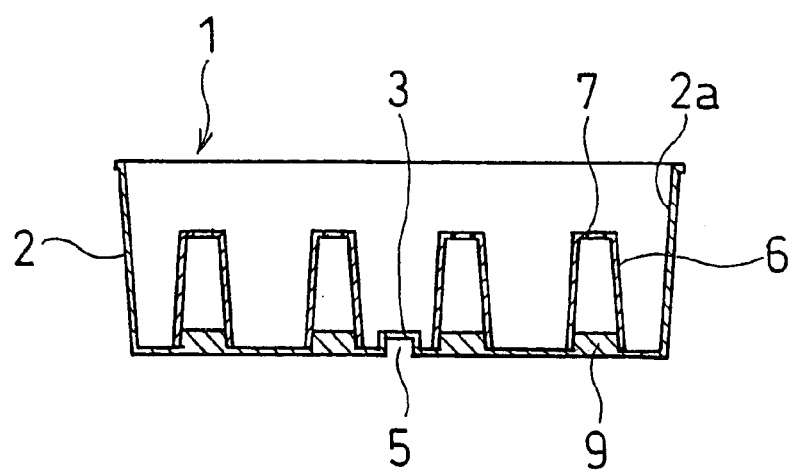
FIG. 2 is a side view in cross-section of the plant cultivation mat shown in FIG. 1, taken along the line I—I thereof.

Referring first to FIGS. 1 and 2, showing the first embodiment of the plant cultivation mat according to the present invention, the mat 1 is composed of a cell 2 disposed in a recessed form with its top part being open upward. The lateral wall 2a of the cell 2 is tapered downward from its top to bottom, forming an inwardly tapered face.

In the bottom part 2b of the cell 2, there are formed protruded parts (or ribs) 3 in both vertical and horizontal directions, and water-passage ports 4 are perforated in the top surface of the protruded parts (ribs) 3 at their predetermined location. The inside of the protruded part 3 forms a space in an inverted U-shape to constitute a concaved groove (opening) 5 to cause excessive water to be drained through this concaved groove 5.

Figure 3:
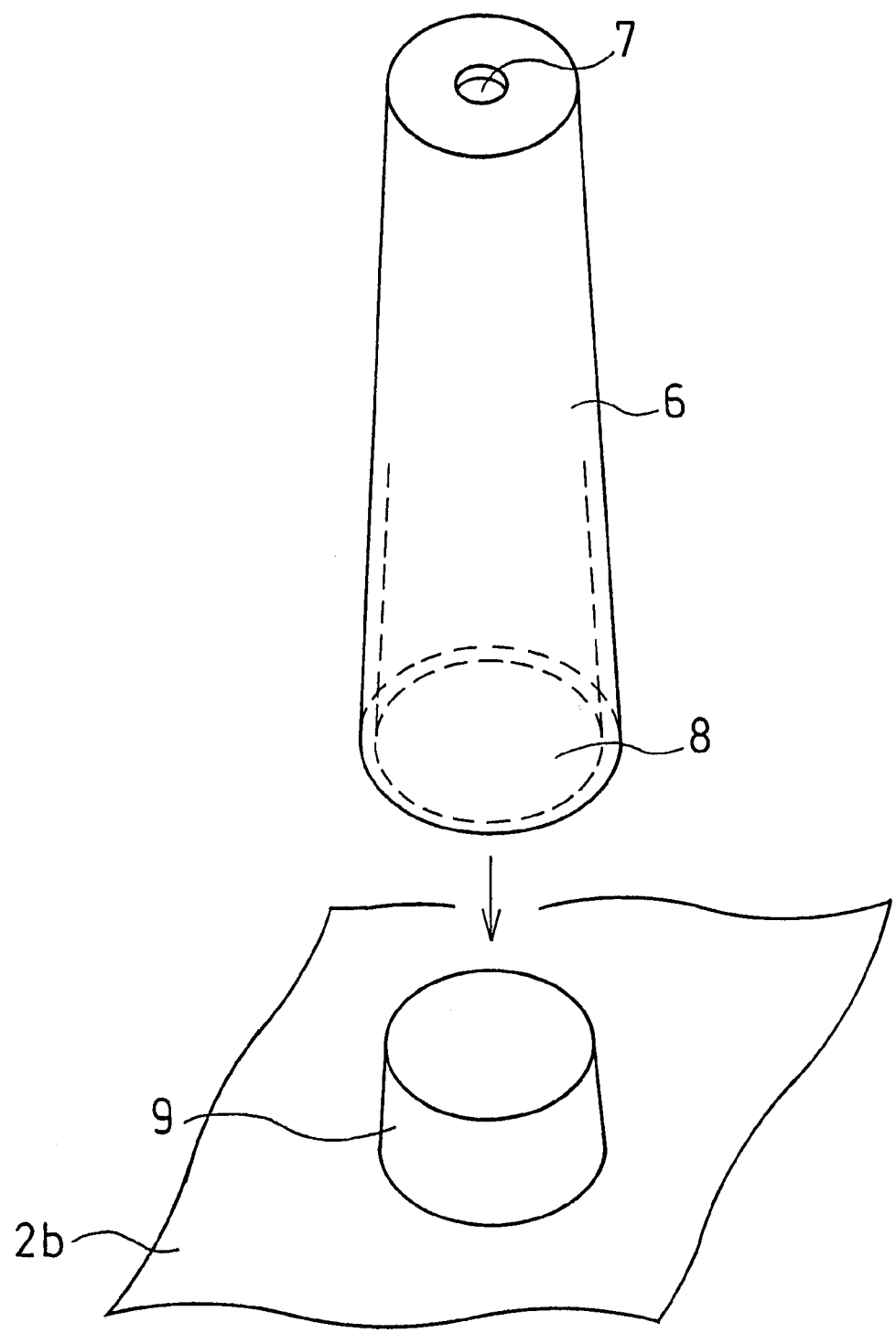
FIG. 3 is a perspective view illustrating the engagement relationship of a pillar member.

In a region defined by the protruded part 3 and the lateral wall 2a of the cell 2, there are fixed in the upright position four pillar members 6 with respect to the bottom part 2a of the cell 2, each pillar member being independent of the others. A small hole 7 is perforated in the top surface of the pillar member. In this embodiment, each pillar member 6 has a height of about ⅗ with respect to the height of the lateral wall 2a of the cell 2. The pillar member 6 is hollow, and its lower part forms an opening part 8 to be engaged with, and fitted to, the peripheral part of the protruded part 9 (see: FIG. 3). The protruded part 9 may take an arbitrary shape, provided that it can be engaged with, and fitted into, the lower inside surface of the pillar member 6. By the way, the small hole can be perforated at any arbitrary location of the pillar member 6.

For the materials to constitute the plant cultivation mat 1, synthetic resins, such as vinyl chloride, polypropylene, polyester, polyethylene, polystyrene, and so forth should preferably be used. These synthetic resin materials are shaped by a molding method such as vacuum molding, blow molding, injection molding, protrusion molding, and so on. Also, the size of the cell 2 is arbitrary.

Figure 4:
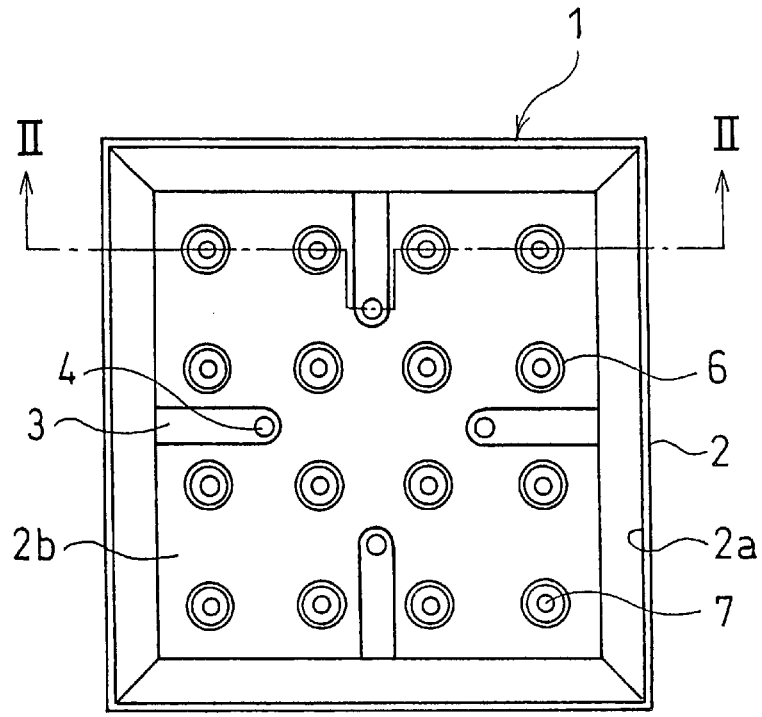
FIG. 4 is a plan view showing a second embodiment of the plant cultivation mat according to the present invention.
Figure 5:
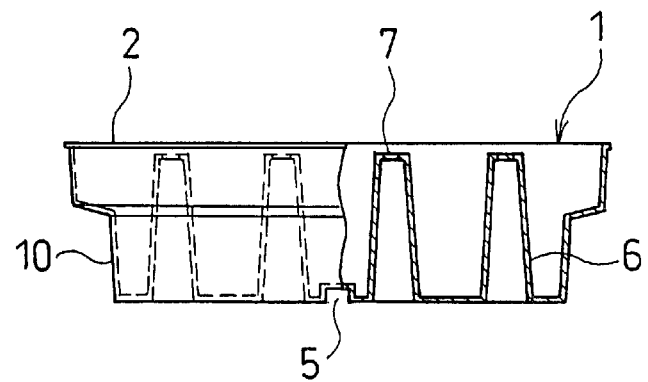
FIG. 5 is a front elevational view, partly in cross-section, of the plant cultivation mat shown in FIG. 4.

FIGS. 4 and 5 illustrate the second embodiment of the plant cultivation mat 1 according to the present invention, This plant cultivation mat 1 consists of a single cell 2 which is disposed in a recessed form, with the lower part of the lateral walls 2a on all four sides being indented inwardly to form an indentation 10.

A raised part (or rib) 3 is formed on the bottom part of the lateral wall 2a of the cell 2, extending toward the center of the bottom face 2b, and a water-passage port 4 is perforated in the upper end surface of the raised part 3 situated near the center of the cell 2. The inside of the raised part 3 forms a space in the form of an inverted U, thus constituting an open part 5 of the recessed groove. Excessive water being discharged from this water-passage port 4 through this opening 5.

Between the adjacent raised parts 3 and the lateral walls 2a of the cell 2, there are erected four independent pillar members 6, a small hole 7 being perforated in the top surface of each of the pillar members. The pillar member is slightly lower than the lateral wall 2a. The pillar member 6 is molded integrally with the cell 2, the inside of which remains hollow with its lower part being open to the external atmosphere.

Figure 6:
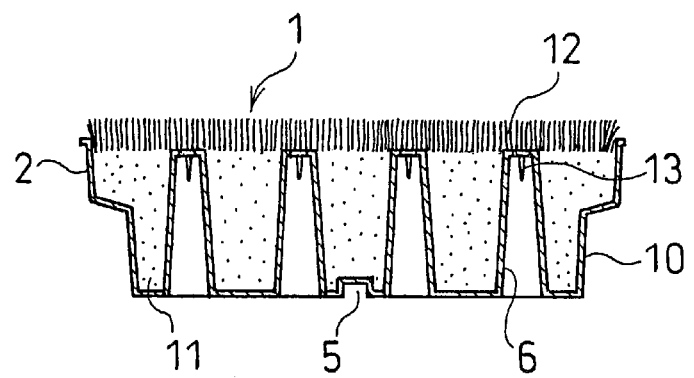
FIG. 6 is a side view in cross-section of the plant cultivation mat shown in FIG. 4, taken along the line II—II thereof, illustrating plant growing ingredients filled in a cell for plant cultivation mat and the turf spread over the entire top surface of the mat.

In the actual use of this plant cultivation mat 1, plant growing ingredients 11 are filled in the cell 2, on the top part of which turf 12 is mounted and fixed in position with a fixing pin 13, as shown in FIG. 6. It may be feasible, for example, that, in place of the fixing pin 13, both ends of a wire bent in a substantial form of a letter "U" are intromitted into the seed sheet, the turf, etc. from their top part, one of both ends being inserted into the small hole 7 perforated in the upper part of the pillar member 6, and the other end being press-contacted and fixed to the outer surface of the pillar member 6. For the fixing work, there may be chosen any appropriate tool.

As mentioned in the foregoing, if and when the upper end surface of the pillar member 6 is flush with, or slightly lower than, the upper end part of the lateral wall 2a of the cell 2, it is possible to fill the cell 2 with the plant growing ingredients 11 at a production site or a mat laying site, and to mount and fasten the turf 12 on top surface of cell. As the consequence, the turf can be prevented from floating to secure favorable root settlement, and, moreover, handling of the cell can be made simple and easy, thus enabling it to be supplied at a low cost.

Figure 7:
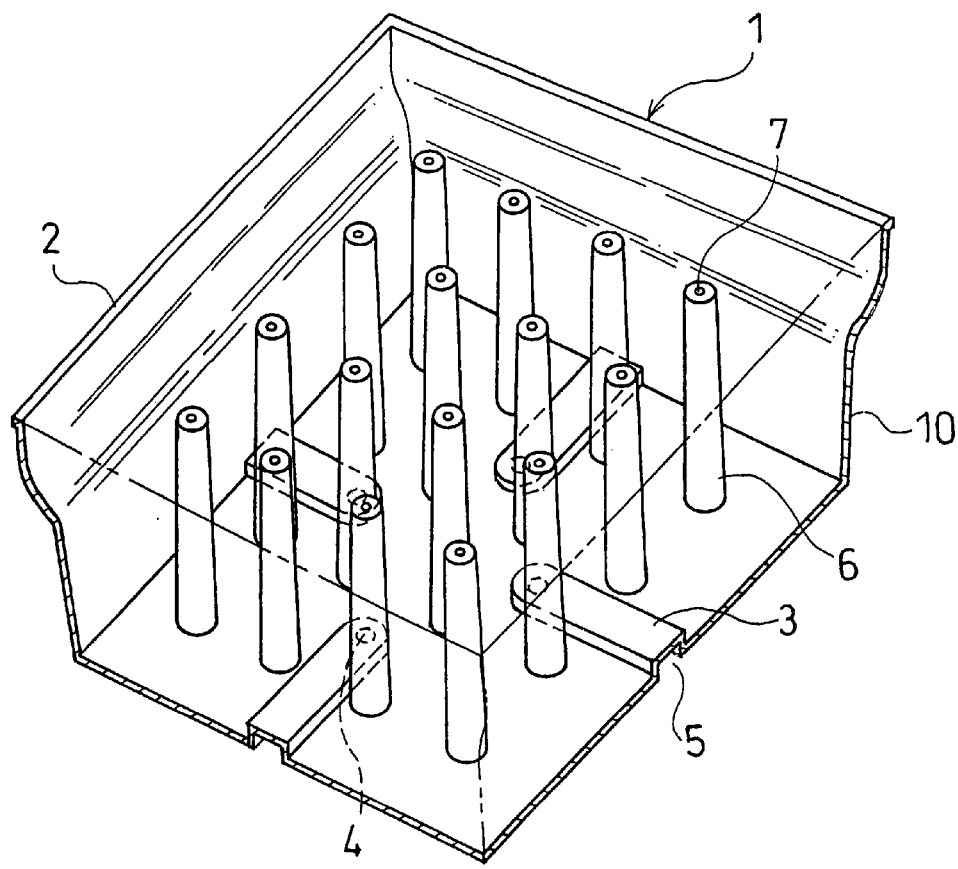
FIG. 7 is a perspective view of the plant cultivation mat shown in FIG. 4.

Further, since a plurality of pillar members 6 are fixed in the upright position (see: FIG. 7), if and when the top surface of the earth-covering plants, etc. as planted in this plant cultivation mat 1 is treaded by walkers in general, the pillar member 6 disperses the compressive force exerted thereto from the top surface to exhibit high strength against it, thereby preventing the plant cultivation mat 1 from breakage, and, at the same time, avoiding any pressure to the soil. In this way, the soil can be prevented from becoming solid and hard to thereby relax any damage possibly caused to the roots of the earth-covering plants.

Figure 8:
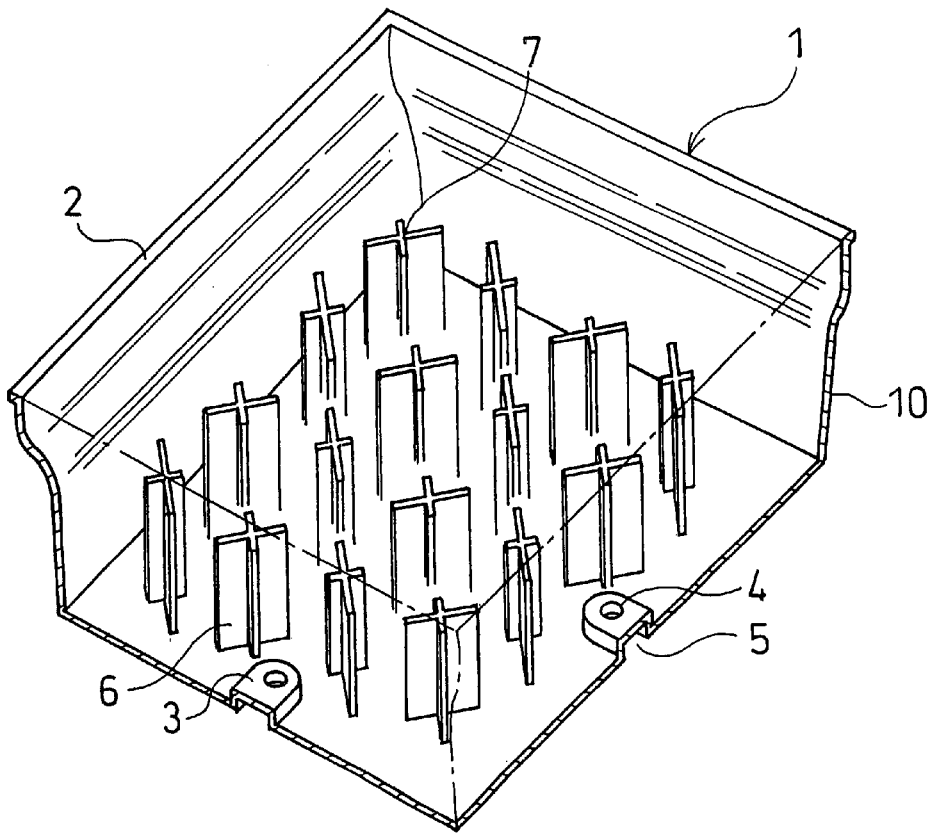
FIG. 8 is a perspective view showing a modification of the second embodiment of the plant cultivation mat according to the present invention.

Besides the above-described embodiments, the pillar member 6 may be solid in its entirely, take a substantially crossed shape, when viewed in plan, and be integrally molded with the cell 2 as shown in FIG. 8. In the alternative, a protruded part 9 is formed on the bottom surface 2b of the cell 2, as shown in FIG. 3, while a recessed part is formed in the lower part of the substantially cross-shaped pillar member 6, followed by mating and fitting of both protruded and recessed parts to realize their joining. Any other appropriate method of joining will serve the purpose.

When turf, etc. is to be fastened onto the plant cultivation mat 1 having the pillar member 6 in such a substantially crossed shape, both ends of the wire bent in a substantially U-shape are intromitted from the top surface part of the turf, etc., or both ends of the substantially U-shaped wire are clasped onto one of the substantially cross-shaped pillar members 6.

Figure 9:
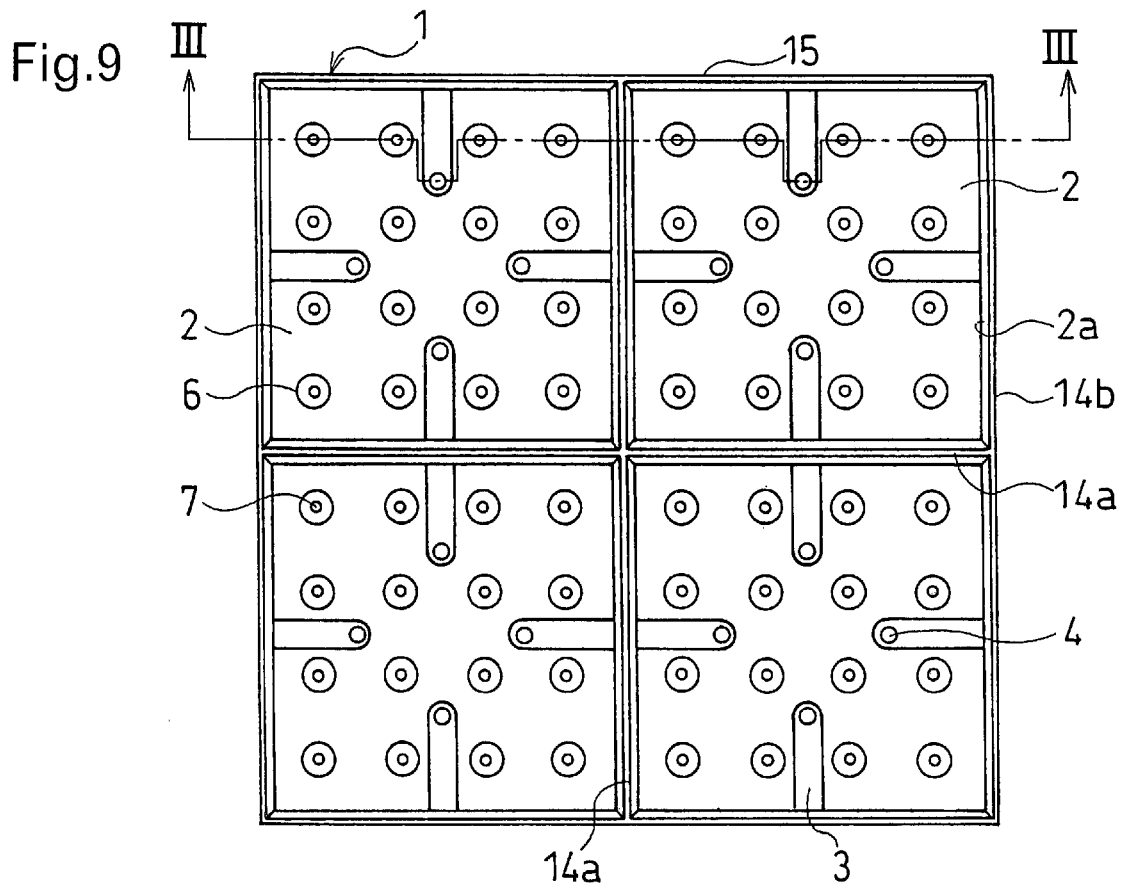
FIG. 9 is a plan view showing a third embodiment of the plant cultivation mat according to the present invention.
Figure 10:
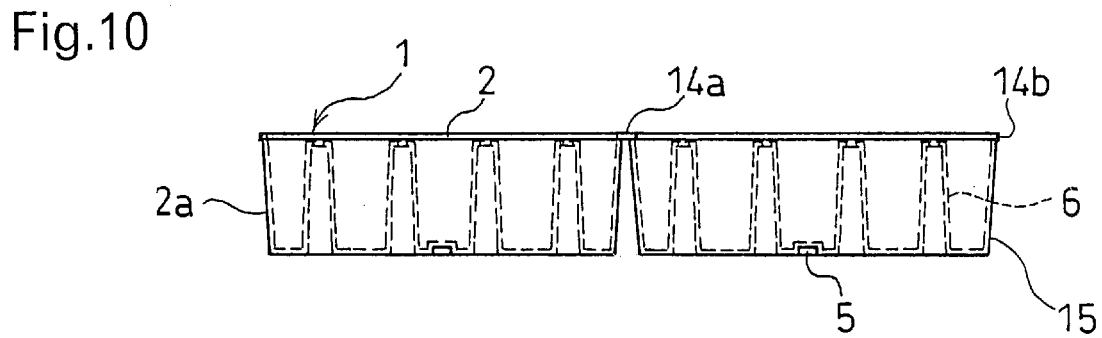
FIG. 10 is a front elevational view of the plant cultivation mat shown in FIG. 9.
Figure 11:
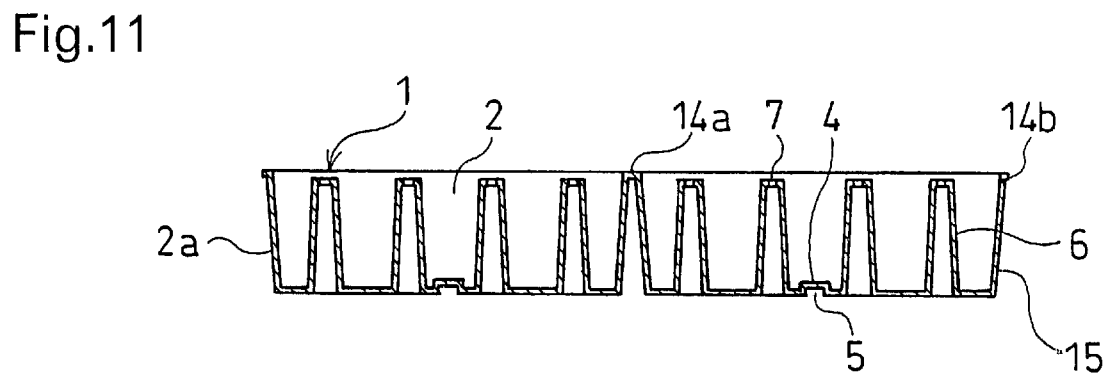
FIG. 11 is a longitudinal cross-sectional view of the plant cultivation mat shown in FIG. 9, taken along the line III—III thereof.

Next, explanations will be given as to an embodiment, wherein a plurality of cells 2 are mutually joined together to construct a plant cultivation mat 1 as an integral whole. FIGS. 9 to 11 illustrate the third embodiment of the plant cultivation mat 1 according to the present invention, as outlined above, wherein a plurality of substantially square-shaped cells 2 are disposed in a recessed form, the adjacent cells 2 being joined together through a connecting rib 14a by their upper end parts to constitute a single square mat frame 15.

A peripheral rib 14b having a height which is the substantially same as that of the connecting rib 14a is provided on the upper end part of the lateral wall 2a of the cell 2 surrounding the outer peripheral part of the mat frame 15. Similarly to the afore-mentioned second embodiment, the mat frame is provided, in and on the bottom surface 2b of each cell 2, with the water-passage port 4, the downwardly open part 5, and a plurality of independent pillar member 6.

Thickness of the connecting rib 14a and the peripheral rib 14b should be such that they may be given flexibility to well keep up with the irregularities, etc. on the laying surface (slab), and, at the same time, have a strength to such an extent that they do not crush the mat frame 15, even if a walker put himself/herself directly on the mat frame 15, or on the walking board laid on the mat frame. The same consideration may become necessary for the thickness of the cell 2. Incidentally, depending on the case, the connecting rib 14a may possibly be provided as a separate element.

The above-mentioned plant cultivation mat 1 is supported by the bottom surfaces 2b of a plurality of cells 2, and exhibits its stability at the time of its bending. At the same time, the mat takes a shape to enable it to be layed down on the slab surface of a roof-top, etc.

Figure 12:
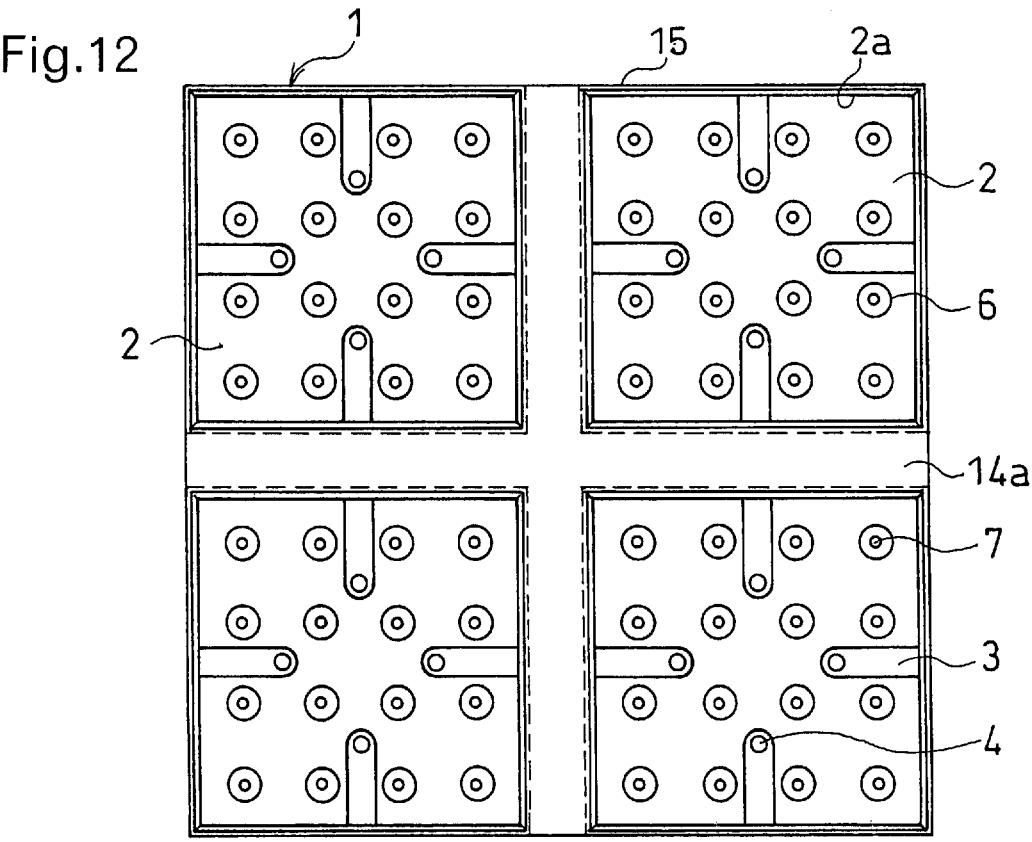
FIG. 12 is a plan view showing a fourth embodiment of the plant cultivation mat according to the present invention.
Figure 13:
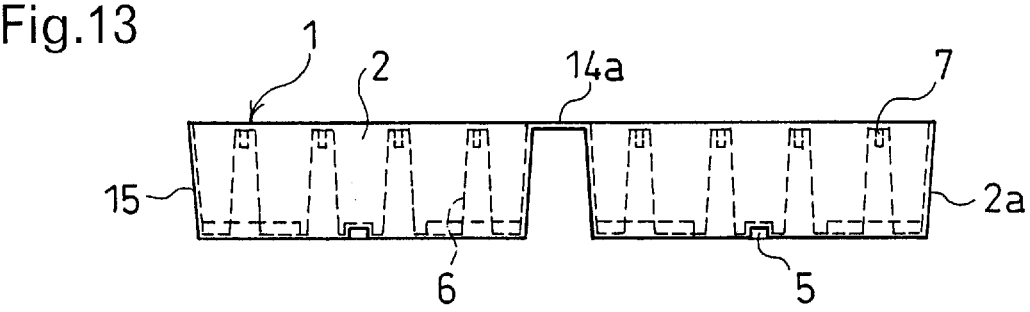
FIG. 13 is a front elevational view of the plant cultivation mat shown in FIG. 12.

Further, the connecting rib 14a and the peripheral rib 14b provided at any appropriate location of the mat frame 15 may be shaped with a large width. FIGS. 12 and 13 illustrate the fourth embodiment of the plant cultivation mat 1, wherein the connecting rib 14a is formed with a large width at the center of the mat frame 15 in its vertical and horizontal directions. The rib to be shaped with a large width is not limited to this embodiment alone, but the connecting rib 14a and the peripheral rib 14b in the vertical direction or the horizontal direction at an appropriate location can be shaped with a large width. The rib can be appropriately made to have a large width either in the vertical direction alone, or in the horizontal direction, or in both vertical and horizontal directions. The width of the rib may be determined arbitrarily depending on necessity.

Figure 14:
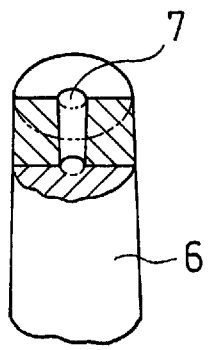
FIG. 14 is a perspective view showing a main part of a small perforation formed on the top part of the pillar member in the fourth embodiment of a plant cultivation mat.

The pillar member 6 in the fourth embodiment is solid throughout its body and integrally molded with the bottom surface 2b of the cell 2, a small hole 7 being perforated in the top surface of each pillar member 6 (see: FIG. 14). The construction of the water-passage port 4 and the opening 5 in the bottom surface 2b thereof is the same as that of the second embodiment.

Figure 15:
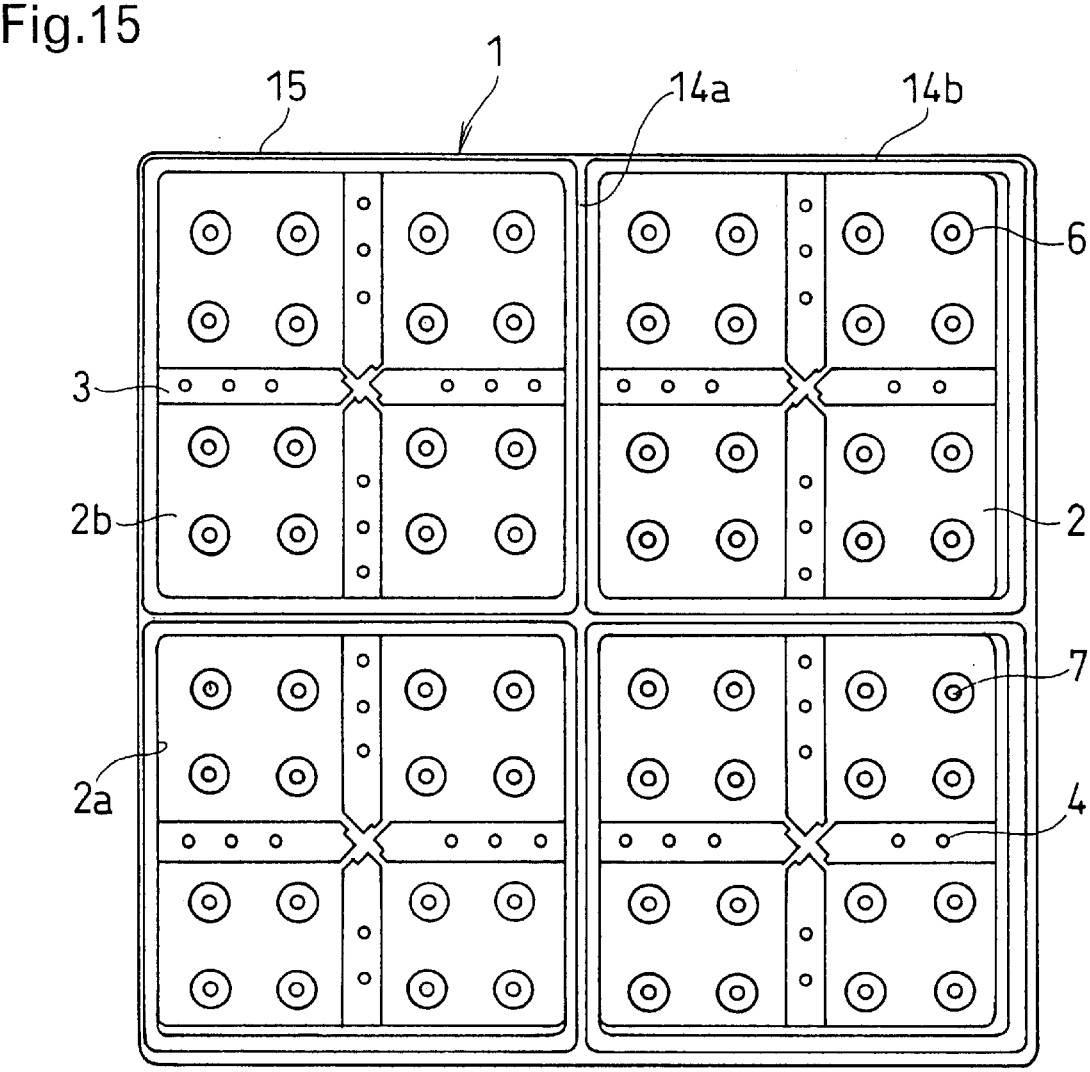
FIG. 15 is a plan view showing a fifth embodiment of the plant cultivation mat according to the present invention.
Figure 16:
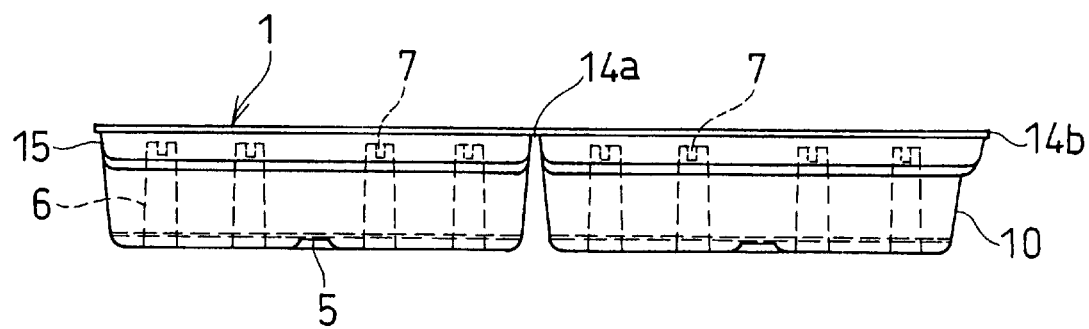
FIG. 16 is a front elevational view of the plant cultivation mat shown in FIG. 15.

As a further embodiment of the present invention, FIGS. 15 and 16 show the fifth embodiment of the plant cultivation mat 1, wherein a plurality of substantially square cells 2 are disposed in a recessed form, and the adjacent cells 2 are mutually joined together by the connecting rib 14a with their upper end part to thereby form a mat frame 15, while, on the outer peripheral part of the mat frame 15, there is provided, on the upper end part of the lateral wall 2a, the peripheral rib 14b having a height which is substantially the same as that of the connecting rib 14a, and the lower part of the outside walls 2a of the cell situated on two mutually adjacent side surfaces (in the drawing, the right side surface and lower side surface) are inwardly indented to form an inward indentation 10.

The raised part 3 is formed from the lower part of the lateral wall 2a toward the center of the bottom surface 2b. On the upper surface of the raised part 3, there is perforated the water-passage port 4 at an appropriate location. The inside of the raised part 3 forms a space in an inverted U-shape, and excessive water is drained through the water-passage port 4 and the opening 5. Between the raised part 3 and the lateral wall 2a, there are erected four independent pillar members 6. A small hole 7 is perforated in the top surface part thereof.

In this embodiment, no structure is exemplified for fixing the pillar member 6 to the bottom surface 2b in the cell 2. For practical purpose, however, either of the following structure may be adopted: i) the pillar member 6 is made hollow inside and molded integrally with the bottom surface 2b; ii) the pillar member 6 is made hollow inside and engaged with, and fitted to, the bottom surface 2b; iii) the pillar member 6 is made solid throughout and molded integrally with the bottom surface 2b; iv) the pillar member 6 is made solid throughout and engaged with, and fitted to, the bottom surface 2b.

Figure 17:
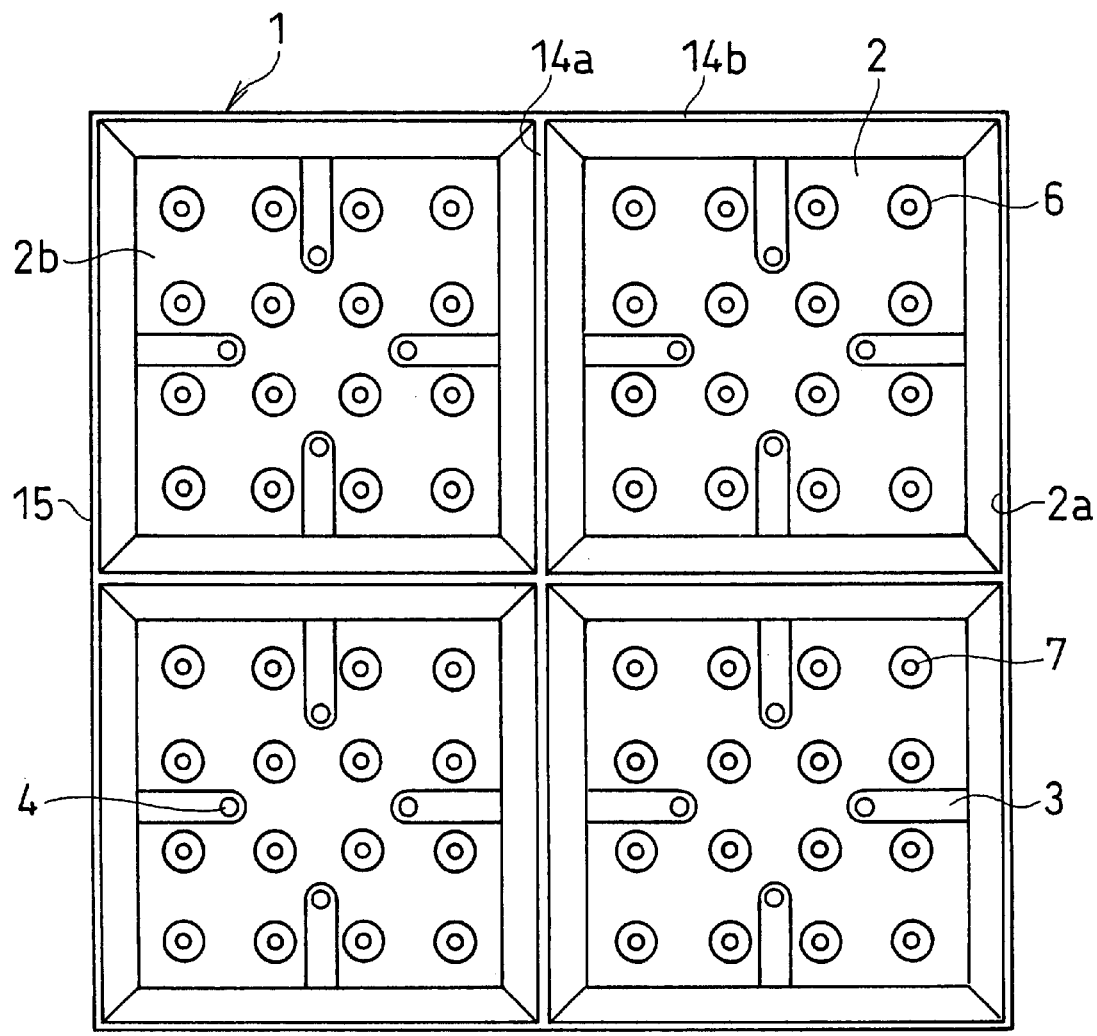
FIG. 17 is a plan view showing a sixth embodiment of the plant cultivation mat according to the present invention.
Figure 18:
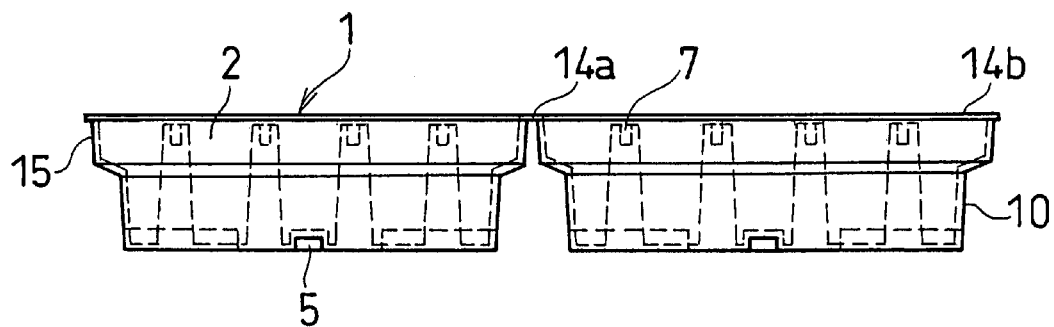
FIG. 18 is a front elevational view of the plant cultivation mat shown in FIG. 17.

The plant cultivation mat according to the sixth embodiment of the present invention is so constructed that a set of four mats as used in the second embodiment are combined together at their upper end part, as an integral whole, by means of the connecting rib 14a and the peripheral rib 14b (see: FIGS. 17 and 18). Each of the cells 2 has an inwardly indented part 10 at the lower part of the lateral walls 2a thereof. It also has the water-passage port 4 and the pillar members 6 fixed in the upright position on the bottom surface 2b, as is the case with the second embodiment.

Figure 19:
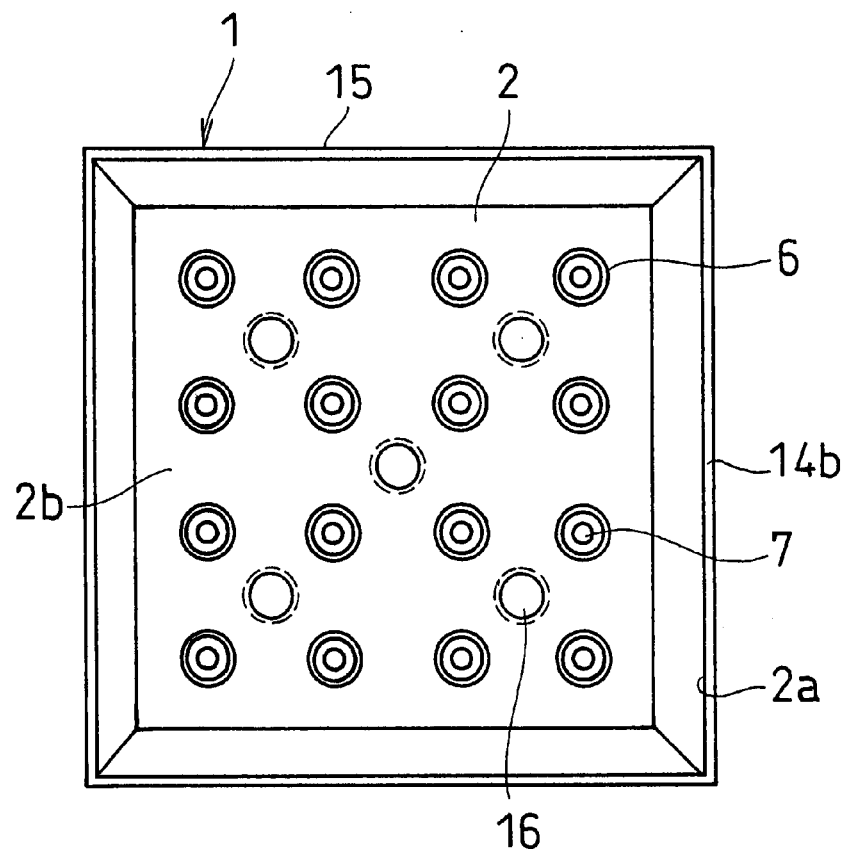
FIG. 19 is a plan view showing a seventh embodiment of the plant cultivation mat according to the present invention.
Figure 20:
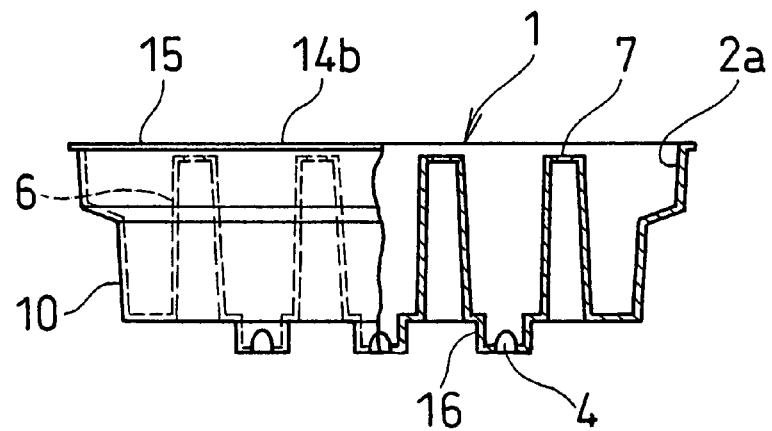
FIG. 20 is a front elevational view, partly in cross-section, of the plant cultivation mat shown in FIG. 19.
Figure 21:
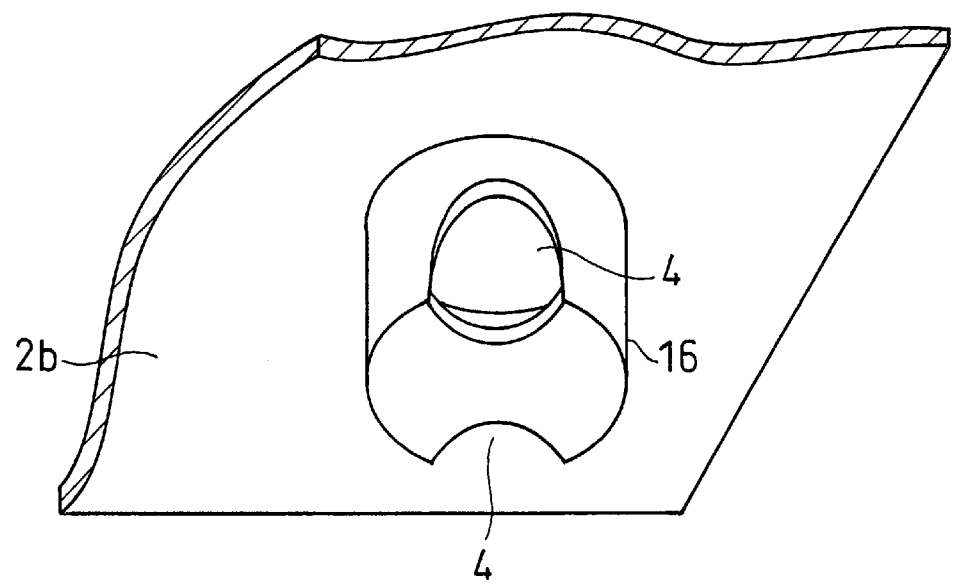
FIG. 21 is a bottom perspective view, in part, of a protrusion from the bottom part of the plant cultivation mat.

The plant cultivation mat 1 according to the seventh embodiment of the present invention is so constructed that the mat frame 15 consists of a single cell, and has the inwardly indented part 10 formed at the lower part of all lateral walls 2a, as shown in FIGS. 19 and 20. While this mat frame has a construction similar to that of the plant cultivation mat 1 of the second embodiment, it has hollow protrusions 16 formed in a predetermined size, at the bottom surface 2b of the cell 2, so as to form the water-passage port 4 in the vicinity of the bottom part of the protrusion 16 by upwardly moving the level of the bottom surface 2b to an appropriate degree (see: FIG. 21).

This plant cultivation mat 1 also has the pillar member 6 fixed in the upright position on the bottom surface 2b, and the small hole 7 perforated in its top part. The pillar member 6 is slightly lower than the lateral wall 2a of the cell 2. Each pillar member 6 is integrally molded with the mat frame 15 made up of a single cell 2. This pillar member 6 is hollow inside with its lower face being open to the external atmosphere.

Figure 22:
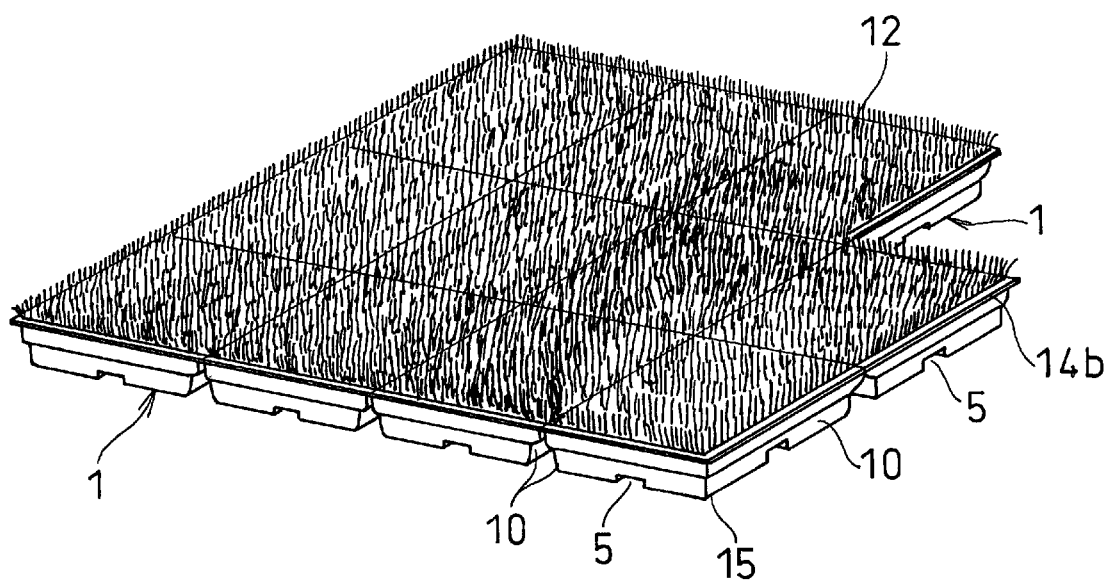
FIG. 22 is a perspective view showing the plant cultivation mat spread over a flat surface.

In the following, explanations will be given as to the manner of laying down the afore-described plant cultivation mat 1. FIG. 22 illustrates an example of the mat laying, wherein the plant cultivation mat 1 of the second embodiment is filled with the plant growing ingredients 11, and then turf 12 is placed over the entire surface of the mat, followed by insertion of the fixing pin 13 into the small hole 7 perforated in the top surface of each independent pillar member 6 as erected in the cell 2, thereby fastening the turf 12 to the mat, after which a plurality of the thus fabricated plant cultivation mats 1 are spread over the entire laying surface such as the roof top of a building, veranda, terrace, and others.

Within each of the plant cultivation mats 1 situated below the lawn surface thus spread thereon, there are fixed in the upright position a plurality of the pillar members 6 to undergo the treading pressure exerted onto the surface of the lawn, on account of which there is no possibility of the soil within the plant cultivation mat 1 setting hard, and of producing an irregularity on the lawn surface, with the consequence that the lawn as layed down can be used over a long period of time in its stabilized condition.

By the way, the shape of the pillar member 6 used for the plant cultivation mat 1 is not limited to those mentioned in the foregoing, but it may arbitrarily be oval, polygonal, conical, pyramidal, etc. For others, it may suffice that they maintain the function and the essential element of the present invention. Also, the height of the pillar member 6 is determined arbitrarily depending on various conditions such as kind of the plant (grass) growing ingredients 11, kind of plants to be grown, and so forth. The plant cultivation mat 1 according to the present invention is not limited to the above-described shape, but it can embrace all types of the plant cultivation mat 1 within the scope of the present invention.

Since the plant cultivation mat according to the present invention is of such construction as has been described in the foregoing, it has the rermarkable effects of maintaining in good and favorable conditions the soil filled in the plant cultivation mat and the plant (grass) grown in this mat, and of permitting the walkers to tread on the plant cultivation mat; more specifically, on the soil and the grass as well.

So far, the present invention has been described in detail with reference to the preferred embodiments thereof. It should, however, be noted that the invention is not limited to these embodiments alone, but any changes and modifications may be made within the spirit and the scope of the invention as recited in the appended claims.

What is claimed is:

1. A plant cultivation mat comprising:
    a cell disposed in a recessed form, a top part of said cell being open upward through an opening formed by an upper end part of a lateral wall of said cell, an inwardly indented part being formed at the lateral wall of said cell, a water-passage port being perforated in a vicinity of a bottom part of said cell; and
    one or a plurality of solid pillar members erected within said cell to a height not exceeding the upper end part of the lateral wall of said cell.

2. A plant cultivation mat as set forth in claim 1, wherein said at least one pillar member is formed in a substantially crossed shape in a plan view.

3. A plant cultivation mat as set forth in claim 1, wherein an upper end surface of said at least one pillar member is lower than an upper end part of the lateral wall of said cell.

4. A plant cultivation mat as set forth in claim 1, wherein a small hole is perforated in the top part of said at least one pillar member.

5. A plant cultivation mat as set forth in claim 1, wherein a raised part having an inner space is formed on a bottom surface of said cell, and said water-passage port is perforated in said raised part.

6. A plant cultivation mat as set forth in claim 1, wherein a hollow protruded part is formed downwardly on a bottom surface of said cell, and said water-passage port is perforated in a vicinity of a bottom part of a said protruded part.

7. A plant cultivation mat as set forth in claim 1, wherein said cell is filled with plant growing ingredients, and plants selected from the group consisting of turf, seed sheets, and others are spread on the top surface part of said plant growing ingredients, said plants being fastened to said plant cultivation mat with fixing means.

8. A plant cultivation mat as set forth in claim 1, wherein said at least one pillar member is fitted to the bottom part of said cell.

9. A plant cultivation mat comprising:
    a cell disposed in a recessed form, a top part of said cell being open upward through an opening formed by an upper end part of a lateral wall of said cell, an inwardly indented part being formed at the lateral wall of said cell, a water-passage port being perforated in a vicinity of a bottom part of said cell;
    one or a plurality of solid pillar members erected within said cell to a height not exceeding the upper end part of the lateral wall of said cell; and
    at least one connecting rib to join said cell with another cell or other cells.

10. A plant cultivation mat as set forth in claim 9, wherein said at least one connecting rib is given flexibility.

11. A plant cultivation mat as set forth in claim 10, wherein said at least one connecting rib is formed on the upper end part of the lateral wall of said cell as an integral whole.

12. A plant cultivation mat as set forth in claim 9, wherein said at least one connecting rib is formed on the upper end part of the lateral wall of said cell as an integral whole.

13. A plant cultivation mat as set forth in claim 9, wherein said at least one pillar member is formed in a substantially crossed shape in a plan view.

14. A plant cultivation mat as set forth in claim 9, wherein an upper end surface of said at least one pillar member is lower than an upper end part of the lateral wall of said cell.

15. A plant cultivation mat as set forth in claim 9, wherein a small hole is perforated in the top part of said pillar member.

16. A plant cultivation mat as set forth in claim 9, wherein a raised part having an inner space is formed on a bottom surface of said cell, and said water-passage port is perforated in said raised part.

17. A plant cultivation mat as set forth in claim 9, wherein a hollow protruded part is formed downwardly on a bottom surface of said cell, and said water-passage port is perforated in a vicinity of a bottom part of said protruded part.

18. A plant cultivation mat as set forth in claim 9, wherein said cell is filled with plant growing ingredients, and plants selected from the group consisting of turf, seed sheets, and others are spread on the top surface part of said plant growing ingredients, said plants being fastened to said plant cultivation mat with fixing means.

19. A plant cultivation mat as set forth in claim 9, wherein said at least one pillar member is fitted to the bottom part of said cell.

\* \* \* \* \*